FREDERICK W. TILTON, OF BRISTOL STATION, ILLINOIS.

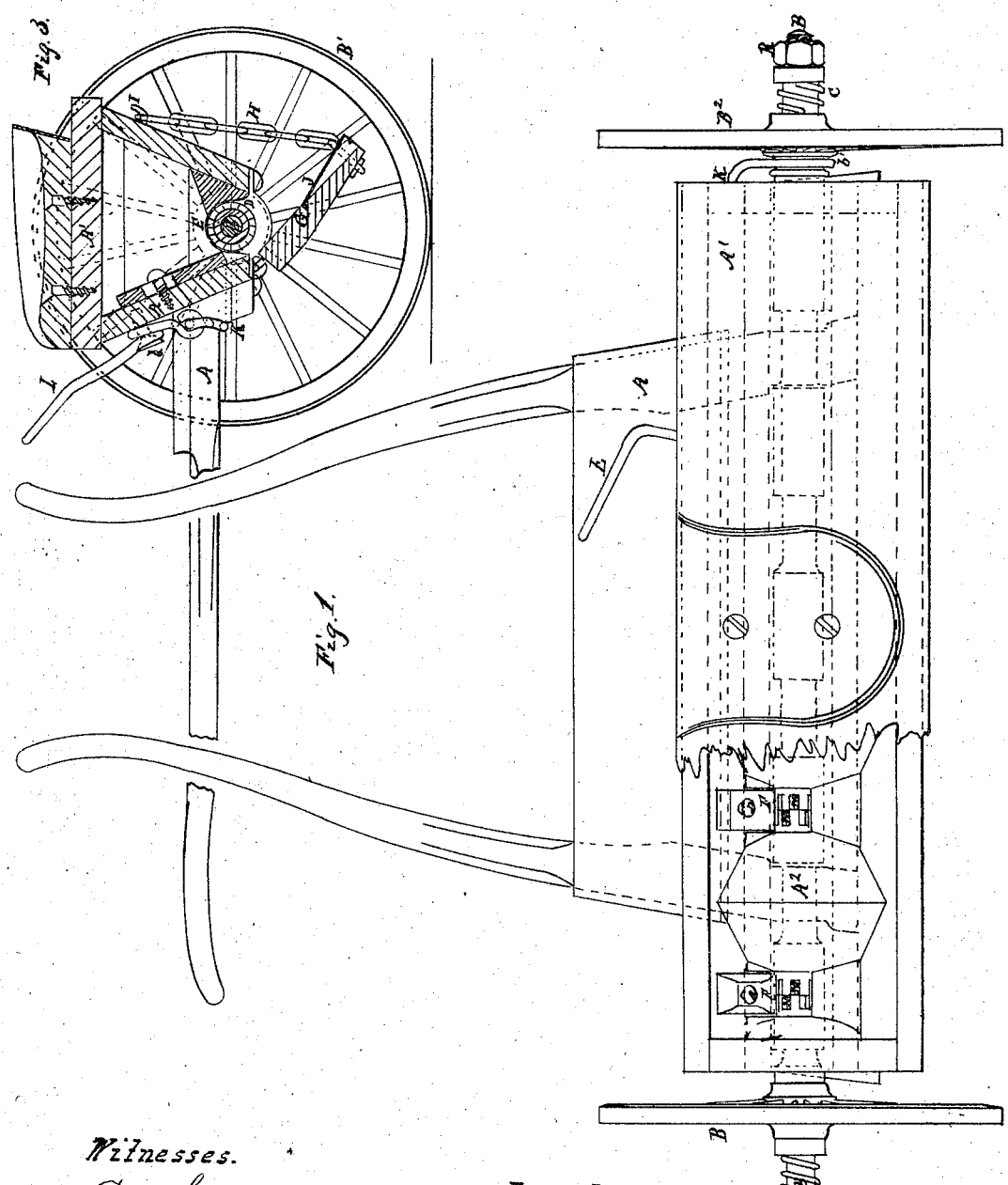

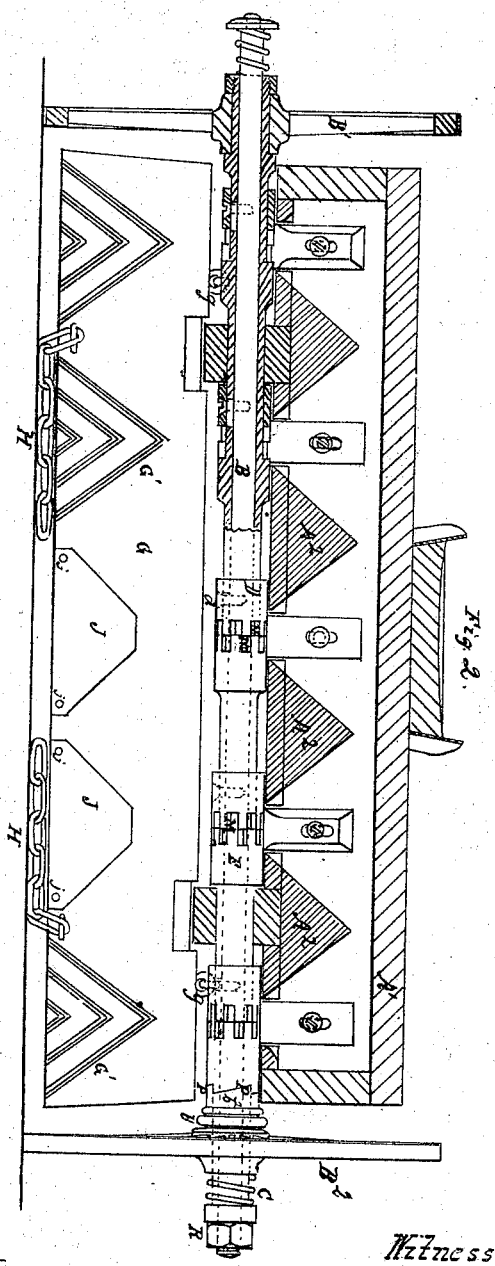

Letters Patent No. 75,601, dated March 17, 1868; antedated March 7, 1868.

IMPROVEMENT IN SEED-SOWER.

The Schedule referred to in these Letters Patent and making part of the same.

TO ALL WHOM IT MAY CONCERN:

Be it known that I, FREDERICK W. TILTON, of Bristol Station, in the county of Kendall, in the State of Illinois, have invented certain new and useful Improvements in Seed-Sowers; and I do hereby declare that the following is a full and exact description thereof.

I will proceed to describe what I consider the best means of carrying out my invention, and will afterwards designate the points which I believe to be new. The accompanying drawings form a part of this specification.

Figure 1 is a plan view, with a portion of the top broken away, the better to exhibit the interior.

Figure 2 is a vertical section.

Figure 3 is a cross-section.

Similar letters of reference indicate like parts in all the figures.

Tints are employed merely to aid in distinguishing parts, and do not indicate material. The material may be wood and iron.

A is a fixed framing, provided with thills for the attachment of a horse. $A^1$ is a cover hinged to A, as represented, carrying a seat for the driver.

B is a shaft, extending the whole length of the machine, on which the weight of the machine is carried, by the aid of two wheels, $B^1$ and $B^2$. The wheel $B^2$ is fixed upon a sleeve, $b^2$, which is provided with teeth, as indicated, and is pressed laterally into corresponding teeth fixed on the shaft B, by means of the spring $b^1$, as represented.

The interior of the casing A serves as the receptacle for the seed. A large portion of the bottom of this receptacle is filled up with blocks of wood $A^2$, as indicated, in order that the seed may not remain in these portions after the seed-receiving cavities have ceased to be filled, when the seed is nearly exhausted.

The seed-receiving cavities are formed partly in the parts D, which are fixed immovably on the shaft B, and partly on the part E, which is adapted to slide endwise on the shaft B, and thereby, at a single operation, to uniformly enlarge or contract the cavities. M denotes the cavities in which the seeds are received, and which are thus enlarged and diminished at pleasure. The machine represented contains five sets of these seed-measuring devices. A greater or less number may be used in any instance if desired.

It will be readily understood from the drawings that the seed in the frame A falls by gravity into the several spaces M as they are presented by the rotation of the shaft B, and that the remainder is kept back by the cut-off F. When the cavities M have passed the cut-off F, and have passed around near the under side of the shaft B, the seeds are precipitated by gravity upon an inclined board, G, which is hinged to the framing A at the points g, and is supported at the proper elevation by the chain H. This chain hooks upon the hooks I, so that the inclination of the board G may be varied by shortening or lengthening the chain, one link at a time. The seed on striking the board G are deflected and scattered. The upper surface of the board is grooved, as indicated by G', the better to effect this end.

Another mode of effecting the scattering, is indicated as applied at two points in the machine, where J J are plates of copper, secured by nails or equivalent fastenings j, in such manner as to be raised in the middle, and thus to present a surface admirably adapted to deflect the seed and spread it in the same manner as broadcast sowing. The nature of copper, by offering very great frictional resistance to any object sliding over it, is peculiarly adapted uniformly to retard and scatter the seed.

The parts D are fixed to the shaft B by the aid of the screws d, which pass through slots in the sleeve E. The end of the shaft B is threaded, and carries a nut, R, by turning which the shaft B, with its connections D, is moved endwise relatively to the sleeve E, and all the several connections D being moved simultaneously, and to the same extent, it follows that all the seed-measuring cavities M are simultaneously increased or diminished in capacity by each turning of the screw-nut R. The spring C, which forces the wheel $B^2$ and its connected sleeve $b^2$, into the toothed spaces, and thus couples or connects the wheel $B^2$ with the sleeve E, also takes up all the slack in the connection between the shaft B and the sleeve E. When the nut is turned in one direction, it diminishes the capacity of the cavities M, and compresses the spring C; when it is turned in the other direction, it allows the spring C to expand, and thus to simultaneously increase the capacity of the cavities M.

K is a slide, operated by the hand-lever L, turning on the pivot $l$, and adapted to push the wheel $B^2$ and its sleeve $b^2$ out of contact with the teeth P on the shaft. When these parts are thus disconnected, the machine may be transported along the road to any distance without turning the seeding-shaft or its connections.

The weight of the entire machine is transmitted through the bearings $A^3$ to the sleeve E, and is thereby supported on the wheels $B^1$ $B^2$. The simplicity of this arrangement saves much expense, and avoids much risk of derangement. Other means than the screw-nut R may be used to move the rod B within sleeve E.

Having now fully described my invention, what I claim as new, and desire to secure by Letters Patent, is as follows:

I claim, in a seed-planting machine, so arranging the sleeve E as to perform the double function of carrying the seeding-devices, and of supporting the weight of the machine, substantially as above set forth.

FREDERICK W. TILTON.

Witnesses:
GEO. W. HARTWELL,
DANL. HAIGH.